United States Patent
Schuller

(10) Patent No.: US 6,514,055 B1
(45) Date of Patent: Feb. 4, 2003

(54) PISTON PUMP HAVING A HOLLOW PISTON

(75) Inventor: Wolfgang Schuller, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/719,684

(22) PCT Filed: Feb. 9, 2000

(86) PCT No.: PCT/DE00/00396

§ 371 (c)(1),
(2), (4) Date: Apr. 18, 2001

(87) PCT Pub. No.: WO00/64717

PCT Pub. Date: Nov. 2, 2000

(30) Foreign Application Priority Data

Apr. 22, 1999 (DE) .......................... 199 18 127

(51) Int. Cl.[7] .......................... F04B 19/02; F04B 19/00; F04B 39/10
(52) U.S. Cl. ....................... 417/460; 417/470; 417/469; 417/549; 417/567; 417/569
(58) Field of Search ................ 417/470, 471, 417/460, 469, 549, 451, 567, 569

(56) References Cited

U.S. PATENT DOCUMENTS

| | | | |
|---|---|---|---|
| 2,433,812 A | * | 12/1947 | Hastings, Jr. et al. ....... 417/460 |
| 2,444,159 A | * | 6/1948 | Godfriaux .................... 417/569 |
| 2,981,198 A | * | 4/1961 | Nettel .......................... 417/250 |
| 3,263,622 A | * | 8/1966 | Tyree, Jr. ..................... 417/460 |
| 4,527,460 A | * | 7/1985 | Eisenbacher et al. ........ 417/460 |
| 6,126,418 A | * | 10/2000 | Sinnl ........................... 417/470 |
| 6,244,295 B1 | * | 6/2001 | Bartussek et al. ........... 137/539 |

FOREIGN PATENT DOCUMENTS

| | | | | |
|---|---|---|---|---|
| DE | 31 33 111 | * | 4/1983 | ............. F15B/1/02 |
| DE | 41 07 979 | * | 9/1992 | ............ F04B/21/08 |
| DE | 197 39 904 | * | 3/1999 | ............ F16K/15/02 |
| FR | 957 606 | * | 2/1950 | ........................ 5/1 |

OTHER PUBLICATIONS

U.S. patent application 09/720,113 Wetzel et al, filed Mar. 26, 2001; Only Figure 1 and Claims 8, 9 and 11–21 have been considered.*

* cited by examiner

*Primary Examiner*—Charles G. Freay
*Assistant Examiner*—Timothy P. Solak
(74) *Attorney, Agent, or Firm*—Ronald E. Greigg

(57) ABSTRACT

The invention relates to a piston pump for a slip-controlled hydraulic vehicle brake system. For the sake of a short structural length of the piston pump, piston of the piston pump is a hollow piston, whose interior forms a positive displacement chamber of the piston pump. The piston can be produced economically as a reshaped part, for instance by deep drawing.

16 Claims, 1 Drawing Sheet

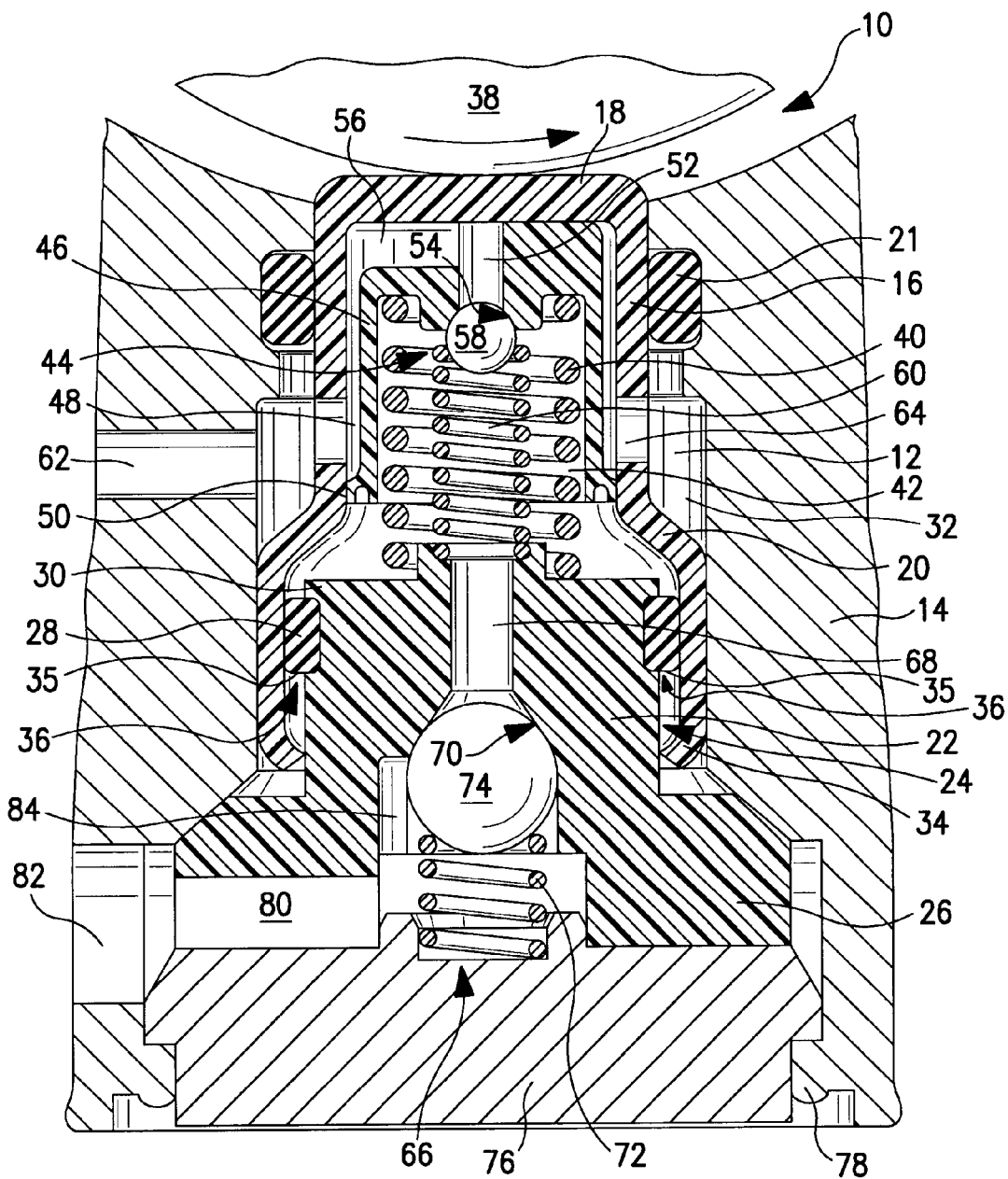

PISTON PUMP HAVING A HOLLOW PISTON

CROSS-REFERENCE TO RELATED APPLICATIONS

This application is a 35 USC 371 application of PCT/DE 00/00396 filed on Feb. 9, 2000.

PRIOR ART

The invention relates to a piston pump which is intended in particular for use in a slip-controlled hydraulic vehicle brake system.

One such piston pump is known for instance from German Patent Disclosure DE 41 07 979 A1. The known piston pump has a cylindrical, boltlike piston, which is produced by metal-cutting machining with grooves (undercuts) and transverse bores as well as an axial blind bore. Producing the piston by metal-cutting machining is complicated and expensive. The piston is guided axially displaceably in a pump bore of a pump housing and can be driven to execute an axially reciprocating stroke motion by means of a rotationally drivable eccentric element. A positive displacement chamber of the piston pump adjoins the piston on one face end of the piston in the pump bore. This has the disadvantage of making the known piston pump long, requiring a large structural volume.

ADVANTAGES OF THE INVENTION

The piston pump according to the invention has a piston embodied as a hollow piston, whose interior forms a positive displacement chamber of the piston pump. Embodying the piston as a hollow piston, thus making it possible to shift the positive displacement chamber into the inside of the piston, makes a short piston pump of compact construction possible. A fixed internal part protrudes into an open side of the piston and defines the positive displacement chamber on one side of the piston. Because of the internal part protruding into the piston, an idle volume of the positive displacement chamber, or in other words a minimum volume of the positive displacement chamber at the end of a supply stroke, can be reduced virtually to zero, thus achieving high efficiency of the piston pump. The piston of the piston pump according to the invention is produced as a reshaped part by reshaping, such as deep drawing, cold heading, or extrusion. The piston is tubular or sleevelike, for instance, with an end wall that closes it on one side, all as one piece. At least before being assembled to the internal part, it has no undercuts and thus can be produced in a single operation quickly and simply by reshaping. To increase its wear resistance, the piston can be hardened; further machining or post-machining, such as fine-machining of its surface, is unnecessary. As a result, the piston can be produced inexpensively and quickly.

The piston is embodied as a stepped piston; that is, it is guided and sealed off in a pump bore in a pump housing at different diameters at two axially spaced-apart points. Embodying the piston as a stepped piston creates an annular chamber surrounding the piston, the volume of which alternatingly increases and decreases during the reciprocating stroke motion of the piston. During a supply stroke of the piston, in which the volume of the positive displacement chamber decreases, the volume of the annular chamber increases, and as a result fluid is aspirated by the piston pump into the annular chamber. During a return stroke of the piston, the volume of the annular chamber does decrease, but the volume of the positive displacement chamber increases to a greater extent than that by which the volume of the annular chamber decreases, and as a result the piston pump aspirates fluid. Because of the embodiment of its piston as a stepped piston, the piston pump according to the invention thus aspirates during both the supply stroke and the return stroke. This has the advantage that a volumetric aspiration flow is more uniform, which improves the aspiration performance and filling of the positive displacement chamber of the piston pump.

In one embodiment of the invention, the internal part has an undercut that the piston engages. The piston and the internal part form a preassembled structural unit; they are joined together in captive fashion. The advantage of this embodiment of the invention is the ease of handling of the preassembled structural unit, including the piston and the internal part, until its installation in a pump housing. Once the preassembled structural unit has been installed in the pump housing, the securing of the piston on the internal part is no longer needed, since the piston is secured on the internal part by the eccentric element. As a result, only slight demands are made in terms of the quality and strength of the connection of the piston and the internal part.

A check valve (inlet or outlet valve) is accommodated in the internal part; this valve controls a flow direction through the piston pump of fluid pumped by the piston pump. Accommodating the check valve in the internal part economizes on installation space and achieves a compact design of the piston pump.

In another refinement the check valve has a valve closing body, which is guided in a valve stroke direction by a valve closing body guide. At least one fluid passage is provided, through which when the check valve is open fluid can overflow the valve closing body. Because of the passage, it is possible to provide close tolerances for the valve closing body guidance with respect to the valve closing body. The close-tolerance valve closing body guide has the advantage of reducing noise, since it largely prevents sideward motions of the open valve closing body, lifted from a valve seat, that are caused by fluid bathing the valve closing body. In one feature of the invention, the valve closing body guide has guide ribs, which extend in the valve stroke direction and are formed for example in the form of a many-grooved internal profile. Flow grooves are located between the guide ribs and together these grooves have a large fluid passage area, so that with close-tolerance valve closing body guidance, the result is low flow resistance of the check valve.

The piston pump of the invention is intended in particular as a pump in a brake system of a vehicle and is used to control the pressure in wheel brake cylinders. Depending on the type of brake system, the abbreviations ABS (for anti-lock brake system), TCS (traction control system), ESP (electronic stability program) and EHB (electrohydraulic brake system) are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or ESP or EHB). The pump is required in a brake system with wheel slip control (ABS or TCS) and/or a brake system serving as a steering aid (ESP) and/or an electrohydraulic brake system (EHB). With wheel slip control (ABS or TCS), locking of the vehicle wheels during a braking event involving strong pressure on the brake pedal (ABS) and/or spinning of the driven wheels of the vehicle in the event of strong pressure on the gas pedal (TCS) can for instance be prevented. In a brake system serving as a steering aid (ESP), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

BRIEF DESCRIPTION OF THE DRAWINGS

The invention will be described in further detail in conjunction with a preferably selected exemplary embodiment shown in the drawing.

The sole drawing FIGURE shows a piston pump of the invention in axial section.

DESCRIPTION OF THE EXEMPLARY EMBODIMENT

The piston pump 10 according to the invention, shown in the drawing, is inserted into a pump bore 12 in a hydraulic block that forms a pump housing 14. The hydraulic block, of which the drawing shows only a fraction surrounding the piston pump 10, is a component of a hydraulic control circuit, otherwise not shown, for a hydraulic traction-controlled vehicle brake system. Besides the piston pump 10, other hydraulic components such as magnet valves are inserted into the hydraulic block and interconnected hydraulically with one another.

The piston pump 10 has a piston 16, embodied as a hollow piston, which is sleevelike and one face end of which is closed by a piston end wall 18 that is integral with the piston 16. Approximately in its longitudinal center, the piston 16 widens with an annular shoulder 20 to a larger diameter in the direction of its open end. The piston 16 is embodied as a stepped piston; that is, it has different diameters in the region of its two ends. On its end closed by the piston end wall 18, the piston 16 is sealed off with a sealing ring 21, inserted into an encompassing groove in the pump bore 12, that rests on the outside of the piston 16. On its open end, the piston 16 is sealed off with a sealing and guide ring 28, to be described below, which rests on the inside of the piston 16. The sealing and guide ring 28 rests on the piston 16 at a larger diameter and seals the piston 16 off at a larger diameter than does the sealing ring 21 on the closed end of the piston 16. Because the piston 16 is sealed off at different diameters, the piston 16 forms a stepped piston, which causes the piston pump 10 to aspirate fluid into a second annular chamber 32 during a supply stroke and into the chamber 42 during a return stroke. This improves the suction performance of the piston pump 10.

In a departure from the exemplary embodiment shown, the piston 16 can be embodied as a so-called single piston, which is sealed off at equal diameters in the region of its two ends. For that purpose, in the exemplary embodiment shown, the annular shoulder 20 would have to increase the piston radius by the thickness of the piston wall. A further option would be to produce the piston 16 without any stepping and to seal it off on the outside of both ends.

Upon its production, the piston 16 has no undercut whatever; it can therefore be produced without problems and quite simply by a reshaping process. In the exemplary embodiment shown, the piston 16 is produced by deep drawing from a metal sheet. To increase its wear resistance, it is hardened; no other machining or post-machining takes place.

Protruding into the open end of the piston 16 is a tanglike extension 22 of an internal part 24 that is mounted in fixed fashion in the pump bore 12. The tanglike extension 22 protrudes in one piece from a circular base disk 26 of the internal part 24, with which disk the internal part 24 is secured in a pump bore 12. In the larger-diameter region, the piston 16 is guided displaceably on the tanglike extension 22 and sealed off.

As shown in the drawing, a sealing and guide ring 28 is seated on the tanglike extension 22 and retained on the circumference of the tanglike extension 22 by a number of calked points 30. The sealing and guide ring 28 rests sealingly on the inside circumference of the piston 16. In this feature of the invention, the internal part 24 with the tanglike extension 22 can for instance be made from steel.

To connect the piston 16 in captive fashion to the internal part 24 until the piston pump 10 is installed in the pump housing 14, a free edge 34 of the piston 16 is deformed radially inward, for instance by crimping or roller-burnishing, after the piston 16 has been placed on the internal part 24. The free edge 34, deformed inward, engages the sealing and guide ring 28. The sealing and guide ring 28 protrudes radially past the circumference of the tanglike extension 22 of the internal part 24. The captive connection of the piston 16 to the internal part 24 produces a preassembled structural unit, which makes handling during storage, transportation and installation in the pump housing 14 substantially simpler.

To drive the piston 16 to execute its reciprocating stroke motion in the pump bore 12, the piston pump 10 has an eccentric element 38, driven to rotate by an electric motor, and the piston 16 is pressed with its end wall 18 against the circumference of the eccentric element by a piston restoring spring 40, embodied as a helical compression spring. The piston restoring spring 40 is disposed in the interior of the piston 16; it is braced on the tanglike extension 22 of the internal part 24 and presses the end wall 18 of the piston against the circumference of the eccentric element 38. The interior of the piston 16, which is defined by the tanglike extension 22 protruding into the open side of the piston 16, forms a positive displacement chamber 42 of the piston pump 10, whose volume increases and decreases in alternation with the reciprocating stroke motion of the piston 16, as a result of which the piston pump 10 pumps fluid, such as brake fluid in a manner known per se.

An inlet valve 44 of the piston pump 10 is accommodated in the interior of the piston 16, which interior forms the positive displacement chamber 42. The inlet valve 44 is embodied as a spring-actuated check valve. The inlet valve 44 has a cup-shaped valve seat part 46, which is made as a plastic part and rests with a bottom on the inside of the piston end wall 18. The piston restoring spring 40 presses the valve seat part 46 from inside against the piston end wall 18 and thereby retains the valve seat part 46 in the piston 16.

The valve seat part 46 has a smaller diameter than an inside diameter of the piston 16, so that there is a first annular chamber 48 between the valve seat part 46 and the piston 16. Toward the open side of the piston 16, a sealing lip 50 closes off the first annular chamber 48. The sealing lip 50 divides the positive displacement chamber 42 from the first annular chamber 48. The bottom of the valve seat part 46 is pierced by a center hole 52, whose orifice is embodied as a conical valve seat 54 of the inlet valve 44. Radial grooves 56 made in a star pattern in the bottom of the valve seat part 46 connect the first annular chamber 48 to the center hole 52.

As its valve closing body, the inlet valve 44 has a valve ball 58, which is pressed against the valve seat 54 by a helical compression spring acting as a valve closing spring 60. The valve closing spring 60 is braced on the tanglike extension 22 of the internal part 24 protruding into the piston 16.

The fluid inlet into the piston pump 10 is effected through an inlet bore 62, which is made in the pump housing 14 and discharges radially into the pump bore 12. From the pump bore 12, fluid flows through through openings 64, stamped out of a circumferential wall of the piston 16, into the first annular chamber 48 between the valve seat part 46 and the circumferential wall of the piston 16, and from there flows onward through the radial conduits 56 and the center hole 52 to the inlet valve 44.

An outlet valve 66 of the piston pump 10 is accommodated in an axially continuous center hole 68 in the internal part 24. The center hole 68 widens conically, forming a valve seat 70. A helical compression spring as a valve closing spring 72 presses a valve ball 74, as a valve closing body, against the valve seat 70.

The valve closing spring 72 is braced on a circular closure disk 76, which is inserted into the pump bore 12. The closure disk 76 is retained in the pump bore 12 by an encompassing calked point 78 of the pump housing 14 and closed the pump bore 12 in pressure-tight fashion. The closure disk 76, for its part, retains the internal part 24, at its base disk 26, firmly in the pump bore 12.

Fluid flowing out through the outlet valve 66 flows through radial conduits 80, arranged in a star pattern, between the base disk 26 of the internal part 24 and the closure disk 76, into an outlet bore 82 made radially to the pump bore 12 in the pump housing 14.

Surrounding the valve ball 74 of the outlet valve 66, the center hole 68 has guide ribs 84, arranged axially parallel in the internal part 24, which are shaped on the order of internal knurling or a many-grooved profile. The guide ribs 84 guide the valve ball 74 with close radial tolerance in the valve stroke direction, that is, the axial direction. Between the guide ribs 84, there are flow grooves, which taken together have a large area for the flow of fluid emerging through the outlet valve 66.

The foregoing relates to preferred exemplary embodiments of the invention, it being understood that other variants and embodiments thereof are possible within the spirit and scope of the invention, the latter being defined by the appended claims.

I claim:

1. A piston pump, having a piston drivable to execute a reciprocating stroke motion, wherein the piston (16) is hollow, and whose interior includes a positive displacement chamber (42) of the piston pump (10); the piston pump (10) includes a fixed internal part (24) which protrudes into the interior of the hollow piston (16); the hollow piston (16) being formed from sheet metal, wherein a valve seat part (46) is positioned within the interior of the hollow piston (16) and divides a first annular chamber (48) from the positive displacement chamber (42), which first annular chamber (48) is formed between the valve seat part (46) and the inner surface of the hollow piston (16), and an inlet valve (44) controlling a fluid flow direction through the piston pump (10) is disposed on the valve seat part (46).

2. The piston pump of claim 1, wherein the piston (16) has a stepped shape.

3. The piston pump of claim 2, wherein the stepped shape of the hollow piston (16) creates a smaller portion and a larger portion of the hollow piston (16), such that the external diameter of the smaller portion is smaller than the internal diameter of the larger portion.

4. The piston pump of claim 3, wherein the hollow piston (16) is placed within a bore (12) of a pump housing (14), and the external diameter of the smaller portion is smaller than the diameter of the bore (12) to form a second annular chamber between the bore (12) and the smaller portion.

5. The piston pump of claim 4, wherein as the piston (16) makes a stroke that forces fluid out of the positive displacement chamber (42), the second annular chamber aspirates fluid into itself.

6. The piston pump of claim 1, wherein a check valve (66) is positioned in the fixed internal part (24).

7. The piston pump of claim 6, wherein the check valve (66) has a valve closing body (74) and a valve closing body guide (84) which guides the valve closing body (74) in a valve stroke direction, and the valve closing body guide (84) has at least one fluid passage through which fluid can flow past the valve closing body (74) when the check valve (66) is open.

8. The piston pump of claim 7, wherein the valve closing body guide (84) is made of guide ribs (84) as a guide for the valve closing body (74), and the guide ribs (84) between them define flow grooves through which fluid can flow past the valve closing body (74) when the check valve (66) is open.

9. The piston pump of claim 1, wherein the inlet valve (44) includes a valve seat (54).

10. The piston pump of claim 9, wherein the inlet valve (44) has a valve opening (52) and a valve closing member (58).

11. The piston pump of claim 10, wherein the valve seat part (46) has a portion that is smaller in external diameter than the internal diameter of the hollow piston (16) to form the first annular chamber between the smaller portion of the valve seat part (46) and the inside of the hollow piston (16).

12. The piston pump of claim 11, wherein the valve seat part (46) has grooves (56) that communicate from the first annular chamber to the valve opening (52).

13. The piston pump of claim 9, wherein a piston restoring spring (40) is positioned between the valve seat part (46) and the fixed internal part (24).

14. The piston pump of claim 13, wherein the inlet valve (44) has a valve opening (52) and a valve closing member (58).

15. The piston pump of claim 14, wherein a valve closing spring (60) is positioned between the valve closing member (58) and the fixed internal part (24).

16. The piston pump of claim 1, wherein the hollow piston is placed within a bore (12) of a pump housing (14), and there is a seal means (21) positioned between the external surface of the hollow piston (16) and the bore (12), and another seal means positioned between the internal surface of the hollow piston and the fixed internal part (24).

* * * * *